United States Patent
Wan et al.

(10) Patent No.: US 11,448,417 B2
(45) Date of Patent: Sep. 20, 2022

(54) CONTROL SYSTEM FOR AIR OUTLET OF AIR CONDITIONER IN VEHICLE AND AIR CONDITIONER FOR VEHICLE

(71) Applicant: FAURECIA (CHINA) HOLDING CO., LTD., Shanghai (CN)

(72) Inventors: Chenghao Wan, Shanghai (CN); Zheng Ren, Shanghai (CN); Ning Xu, Shanghai (CN)

(73) Assignee: FAURECIA (CHINA) HOLDING CO., LTD., Shanghai (CN)

( * ) Notice: Subject to any disclaimer, the term of this patent is extended or adjusted under 35 U.S.C. 154(b) by 183 days.

(21) Appl. No.: 16/893,232

(22) Filed: Jun. 4, 2020

(65) Prior Publication Data
US 2021/0018213 A1 Jan. 21, 2021

(30) Foreign Application Priority Data
Jul. 17, 2019 (CN) .......................... 201910645863.7

(51) Int. Cl.
| | |
|---|---|
| *F24F 11/72* | (2018.01) |
| *B60H 1/00* | (2006.01) |
| *F16D 11/16* | (2006.01) |
| *F24F 11/83* | (2018.01) |
| *B60H 1/34* | (2006.01) |
| *F16D 11/00* | (2006.01) |

(Continued)

(52) U.S. Cl.
CPC .......... *F24F 11/83* (2018.01); *B60H 1/00021* (2013.01); *F16D 11/16* (2013.01); *F24F 11/72* (2018.01); *B60H 2001/00185* (2013.01); *B60H 2001/3471* (2013.01); *B60H 2001/3478* (2013.01); *F16D 11/00* (2013.01); *F16D 2011/006* (2013.01); *F16D 2125/46* (2013.01); *F24F 11/74* (2018.01)

(58) Field of Classification Search
CPC . F24F 11/72; F24F 11/74; F24F 11/83; B60H 1/00007; B60H 1/00021; B60H 1/34; B60H 2001/00185; B60H 2001/3471; B60H 2001/3478; F16D 11/00; F16D 11/16; F16D 2011/006; F16D 2125/44; F16D 2125/46; F16D 2125/48; F16D 2125/56

See application file for complete search history.

(56) References Cited

U.S. PATENT DOCUMENTS

| | | | | |
|---|---|---|---|---|
| 5,660,586 | A | * | 8/1997 | Chiu ....................... F04D 25/10 454/285 |
| 9,188,352 | B2 | * | 11/2015 | Wiese ...................... F24F 11/30 |

* cited by examiner

*Primary Examiner* — Henry T Crenshaw
*Assistant Examiner* — Daniel C Comings
(74) *Attorney, Agent, or Firm* — Reising Ethington P.C.

(57) ABSTRACT

A control system for an air outlet of an air conditioner in a vehicle includes a motor, a first clutch configured to control a horizontal vane of the air outlet, a second clutch configured to control a longitudinal vane of the air outlet, a third clutch configured to control an opening degree of a ventilation door of the air outlet, and an engaging element of the motor being connected to the motor, for engaging the clutches. The motor adjusts the horizontal vane of the air outlet when the engaging element is engaged with the first clutch, the motor adjusts the longitudinal vane of the air outlet when the engaging element is engaged with the second clutch, and the motor adjusts the opening degree of the ventilation door of the air outlet when the engaging element of the motor is engaged with the third clutch.

12 Claims, 4 Drawing Sheets

(51) Int. Cl.
*F16D 125/46* (2012.01)
*F24F 11/74* (2018.01)

CONTROL SYSTEM FOR AIR OUTLET OF AIR CONDITIONER IN VEHICLE AND AIR CONDITIONER FOR VEHICLE

TECHNICAL FIELD

[pool] The present invention relates to the field of vehicle technologies, and in particular, to a control system for an air outlet of an air conditioner in a vehicle and an air conditioner in a vehicle having the control system.

BACKGROUND

An air outlet of an air conditioner in a vehicle usually has three adjusting functions: a horizontal wind direction, a longitudinal wind direction, and an opening degree of a ventilation door, which are respectively adjusted by a horizontal vane, a longitudinal vane and the ventilation door. In an old-fashioned air outlet of an air conditioner in a vehicle, usually only the ventilation door is electronically adjusted, whereas the horizontal vane and the longitudinal vane are both manually adjusted, and even the three are all manually adjusted. However, with the development of operation automation, all of the three functions are operated electronically. This is a development trend of parts of the vehicle.

However, in the prior art, the horizontal vane, the longitudinal vane, and the ventilation door are respectively controlled by three motors. This configuration results in higher costs.

The present invention aims to address this drawback.

SUMMARY

To this end, embodiments of the present invention provide a control system for an air outlet of an air conditioner in a vehicle, including:
a motor;
at least two clutches which at least comprising:
a first clutch for controlling one element selected from a horizontal vane, a longitudinal vane or an opening degree of a ventilation door of the air outlet of the air conditioner, and
a second clutch for controlling another element selected from a horizontal vane, a longitudinal vane or an opening degree of a ventilation door of the air outlet of the air conditioner; and
an engaging element of the motor, which connects to the motor, for engaging respectively with each of the at least two clutches,
wherein, the motor adjusts one element among the horizontal vane, the longitudinal vane or the opening degree of a ventilation door of the air outlet of the air conditioner when the engaging element of the motor is engaged with the first clutch; and
the motor adjusts another element among the horizontal vane, the longitudinal vane or the opening degree of a ventilation door of the air outlet of the air conditioner when the engaging element of the motor is engaged with the second clutch.
Preferably, the number of clutches is three:
a first clutch configured to control a horizontal vane of the air outlet of the air conditioner;
a second clutch configured to control a longitudinal vane of the air outlet of the air conditioner; and
a third clutch configured to control an opening degree of a ventilation door of the air outlet of the air conditioner.

Wherein, the engaging element of the motor is able to engage respectively with the first clutch, the second clutch, and the third clutch.

Wherein, the motor adjusts the horizontal vane of the air outlet of air conditioner when the engaging element of the motor is engaged with the first clutch;
the motor adjusts the longitudinal vane of the air outlet of air conditioner when the engaging element of the motor is engaged with the second clutch; and
the motor adjusts the opening degree of the ventilation door of the air outlet of air conditioner when the engaging element of the motor is engaged with the third clutch.

Further, the control system may include a disk having a first chute provided with a first slider for connecting the horizontal vane of the air outlet of the air conditioner, a second chute provided with a second slider for connecting the longitudinal vane of the air outlet of the air conditioner, and a third chute provided with a third slider for connecting the ventilation door of the air outlet of the air conditioner. The first chute and the first slider form the first clutch, the second chute and the second slider form the second clutch, and the third chute and the third slider form the third clutch.

Wherein, the first chute, the second chute, and the third chute are evenly distributed near an edge of the disk and penetrate the disk. Structures of the first clutch, the second clutch and the third clutch are the same.

Further, the engaging element of the motor may be in the form of a deflector rod, one end of the deflector rod being connected to the motor, and the other end of the deflector rod respectively deflecting the first slider to slide in the first chute, the second slider to slide in the second chute, and the third slider to slide in the third chute, thereby respectively adjusting the horizontal vane, the longitudinal vane and the ventilation door.

Further, the first slider may be provided with a first slide rail, the second slider with a second slide rail, and the third slider with a third slide rail, wherein, the deflector rod slides respectively in the first slide rail, the second slide rail, and the third slide rail.

Further, the first slide rail, the second slide rail, and the third slide rail are respectively shaped slide rails.

Further, the first slide rail may be provided with a first notch, the second slide rail with a second notch, and the third slide rail with a third notch, so that the deflector rod can be stuck in the notch, to be relatively fixed with the sliders and drive the slider to slide.

Further, the first slide rail may be provided with a first block, the second slide rail with a second block, and the third slide rail with a third block.

Further, the first block, the second block, and the third block are respectively shaped pieces.

Further, the first block may be provided with a first gap, the second block with a second gap, and the third block with a third gap, so that the deflector rod can be stuck in the gaps, to be relatively fixed with the sliders and drive the sliders to slide in an opposite direction.

Embodiments of the present invention further provide an air conditioner in a vehicle, including an air outlet, a longitudinal vane, a horizontal vane, a ventilation door, and the foregoing control system.

According to embodiments of the control system, the horizontal vane, the longitudinal vane, and the ventilation door are independently controlled at different times through one motor. Thereby, the quantity of parts is reduced, the structure is simplified, and the cost is reduced.

BRIEF DESCRIPTION OF THE DRAWINGS

It should be understood that all features, optional solutions, and/or embodiments of the present invention can be associated according to different combinations as long as they are not incompatible or mutually exclusive.

With reference to the following accompanying drawings, other features and advantages of the present invention will be apparent from the following description of the embodiments of the present invention, which are listed as non-limiting examples.

DETAILED DESCRIPTION

Figure 1:
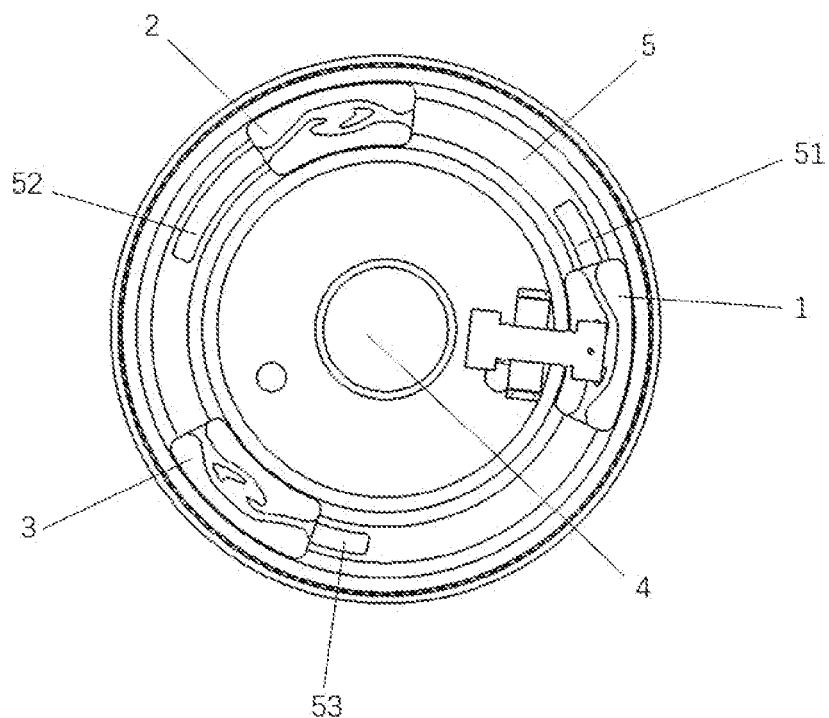
FIG. 1 is an overall schematic diagram of a control system for an air outlet of an air conditioner in a vehicle according to an embodiment of the present invention.

It should be understood that the drawings are not necessarily drawn to scale, but rather show a somewhat simplified representation of various preferred features illustrative of the basic principles of the present invention. The specific design features disclosed herein, including, for example, specific dimensions, orientations, locations, and shapes, are determined to a certain extent by specific intended purposes and use environments.

The present invention is described through the embodiments and the accompanying drawings. In the drawings, the same reference numerals are used to represent the same item or similar items.

Figure 6:
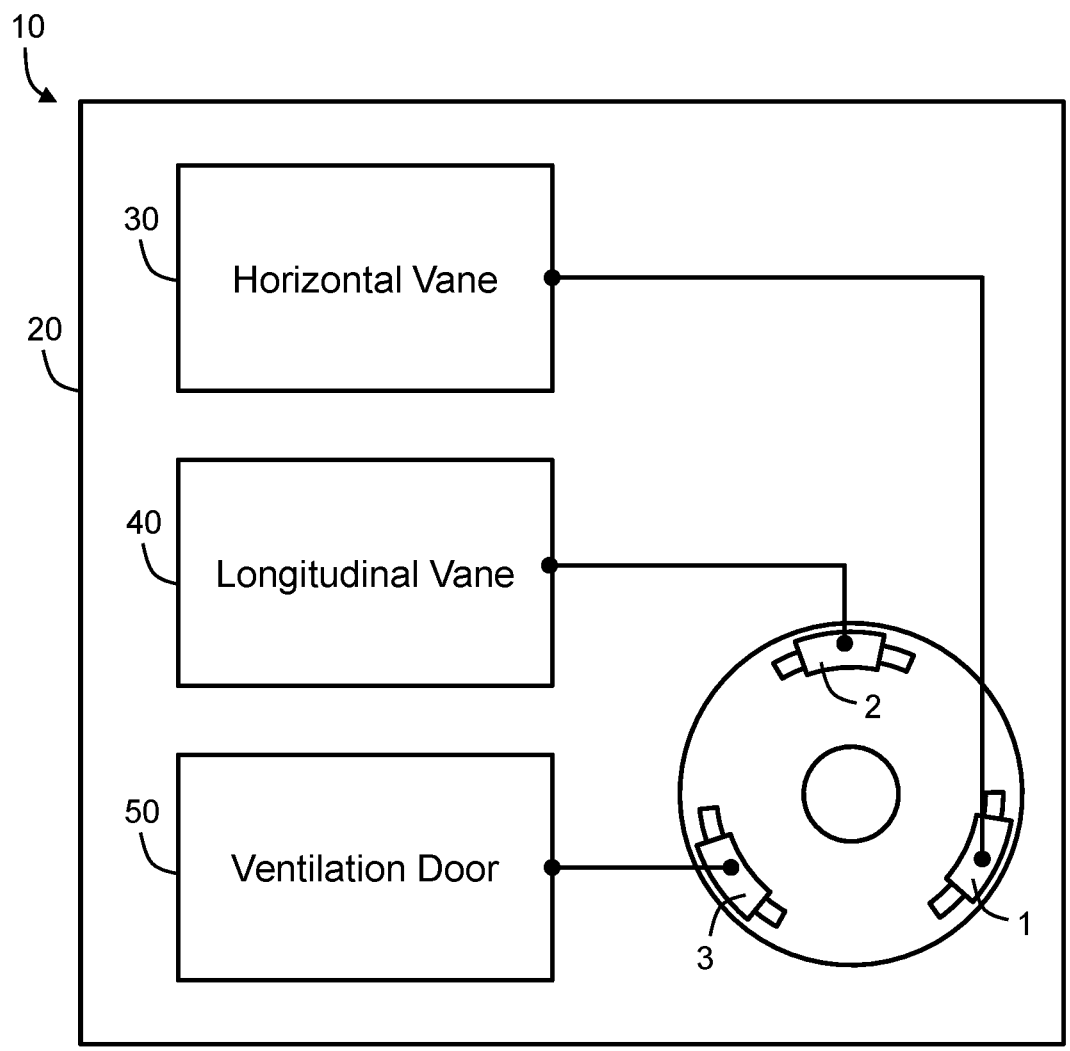
FIG. 6 is a schematic view of the control system of FIG. 1 as part of an air outlet of an air conditioner.

FIG. 1 and FIG. 6 exemplarily show a control system for an air outlet 20 of an air conditioner 10 in a vehicle according to an embodiment of the present invention. In this embodiment, the control system comprises three clutches.

It can be seen from FIG. 1 and FIG. 6 that the control system includes a motor 4 and a disk 5. A first chute 51, a second chute 52 and a third chute 53 are evenly distributed near an edge of the disk 5, and each chute penetrates the disk 5. The first chute 51 is provided with a first slider 1 connecting to a horizontal vane 30, the second chute 52 is provided with a second slider 2 connecting to a longitudinal vane 40, and the third chute 53 is provided with a third slider 3 connecting to a ventilation door 50. Each slider can slide clockwise or counterclockwise in a respective chute to respectively drive the horizontal vane, the longitudinal vane and the ventilation door.

The first chute 51 and the first slider 1 form a first clutch, the second chute 52 and the second slider 2 form a second clutch, and the third chute 53 and the third slider 3 form a third clutch.

The motor 4 has an engaging element. In this embodiment, the engaging element is in the form of a deflector rod 41. One end of the deflector rod 41 connects to the motor 4, and the other end of the deflector rod respectively engages with the first slider 1, the second slider 2 and the third slider 3. The deflector rod 41 is driven by the motor to rotate clockwise or counterclockwise, thereby driving each slider to slide in a respective chute, to respectively control the horizontal vane, the longitudinal vane and the ventilation door.

Because structures and working principles of all the clutches are same, the first clutch is specifically described below as an example.

FIG. 2 to FIG. 5 respectively show detailed views of the first clutch.

A first slide rail 11 is provided on the first slider 1. The first slide rail 11 is a female relief-like shaped slide rail, and the deflector rod 41 can slide therein and can slide into or out from either of both ends of the first slide rail 11.

The first slide rail 11 is further provided with a first notch 12. When the deflector rod 41 rotates counterclockwise, the deflector rod 41 can be stuck in the first notch 12 to be relatively fixed with the first slider 1 and drive the first slider 1 to slide counterclockwise in the first chute 51.

The first slide rail 11 is further provided with a first block 13 which is independently disposed in the first slide rail 11 in an island shape. The first block 13 is a shaped piece and is provided with a first gap 14. When the deflector rod 41 rotates clockwise, the deflector rod 41 can be stuck in the first gap 14 to be relatively fixed with the first slider 1 and drive the first slider 1 to slide clockwise in the first chute 51.

FIG. 2 to FIG. 5 respectively show different sliding trajectories of the deflector rod 41 in the first slide rail 11 to show a working principle of the control system.

Figure 2:
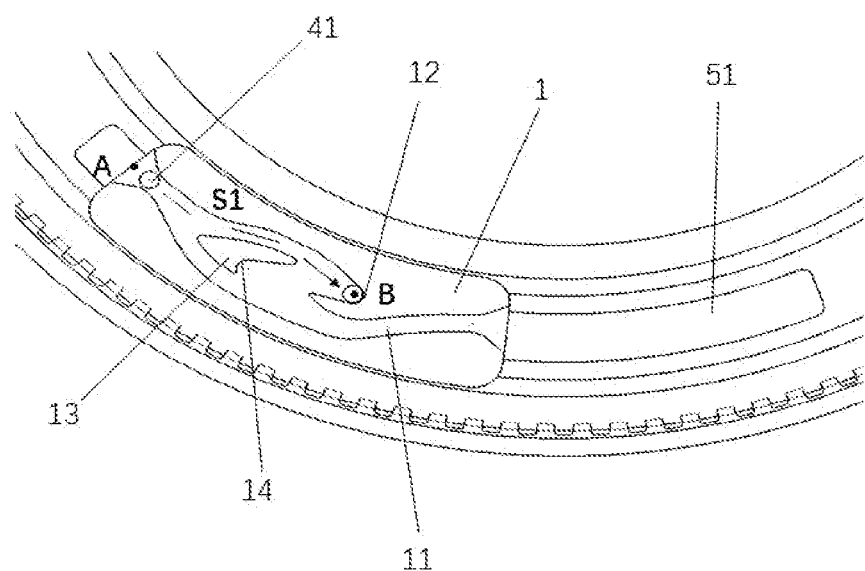
FIG. 2 is a detailed view of a first clutch in FIG. 1, where a deflector rod moves along a trajectory S1.

FIG. 2 shows a movement trajectory S1 of the deflector rod 41. In the figure, a point A is located at an entrance of the first slide rail 11, and a point B is located at the first notch 12 of the first slide rail 11. When the deflector rod 41 moves counterclockwise, the deflector rod enters the first slide rail 11 from the point A. In a process of the deflector rod 41 sliding counterclockwise from the point A to the point B along the trajectory S1, the first slider 1 remains stationary relative to the first chute 51, and the deflector rod 41 slides counterclockwise relative to the first slider 1. When the deflector rod 41 reaches the point B, the deflector rod is stuck in the first notch 12, the deflector rod 41 and the first slider 1 remain relatively fixed, and engagement between the deflector rod 41 and the first clutch is completed, so that the deflector rod 41 drives the first slider 1 to slide counterclockwise in the first chute 51, thereby driving the horizontal vane to move in one direction.

Figure 3:
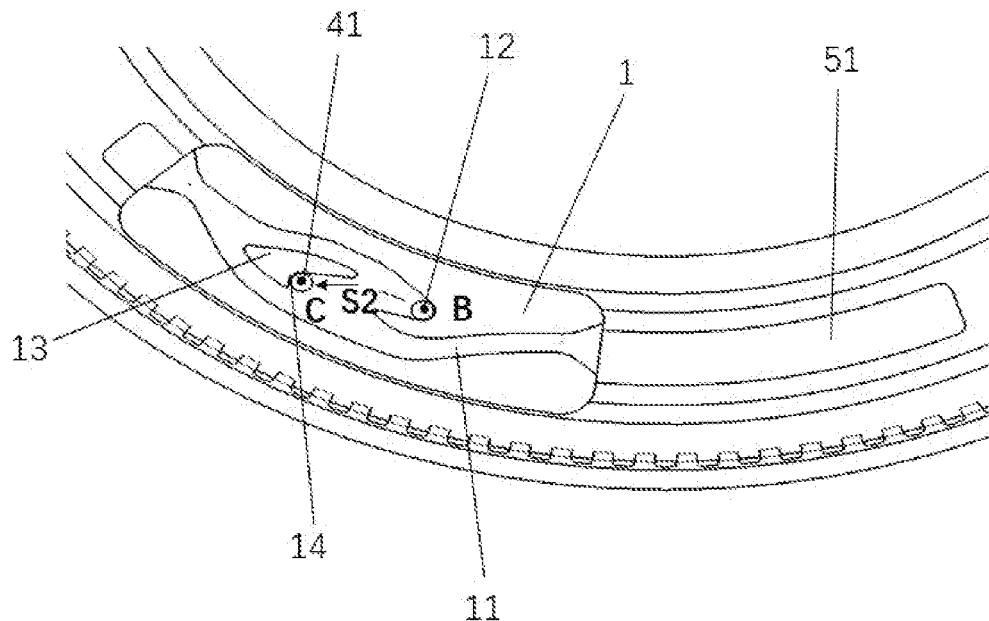
FIG. 3 is a detailed view of a first clutch in FIG. 1, where a deflector rod moves along a trajectory S2.

FIG. 3 shows a movement trajectory S2 of the deflector rod 41. In the figure, a point B is located at the first notch 12 of the first slide rail 11, and a point C is located at the first gap 14 of the first block 13. When the deflector rod 41 starts to move clockwise from the point B, the engagement between the deflector rod 41 and the first clutch is released, the first slider 1 remains stationary relative to the first chute 51, and the deflector rod 41 slides clockwise along the trajectory S2 relative to the first slide rail 11. When the deflector rod 41 reaches the point C, the deflector rod 41 remains fixed relative to the first slider 1 and re-engages with the first clutch, thereby driving the first slider 1 to slide clockwise in the first chute 51 and driving the horizontal vane to move in another direction.

Figure 4:
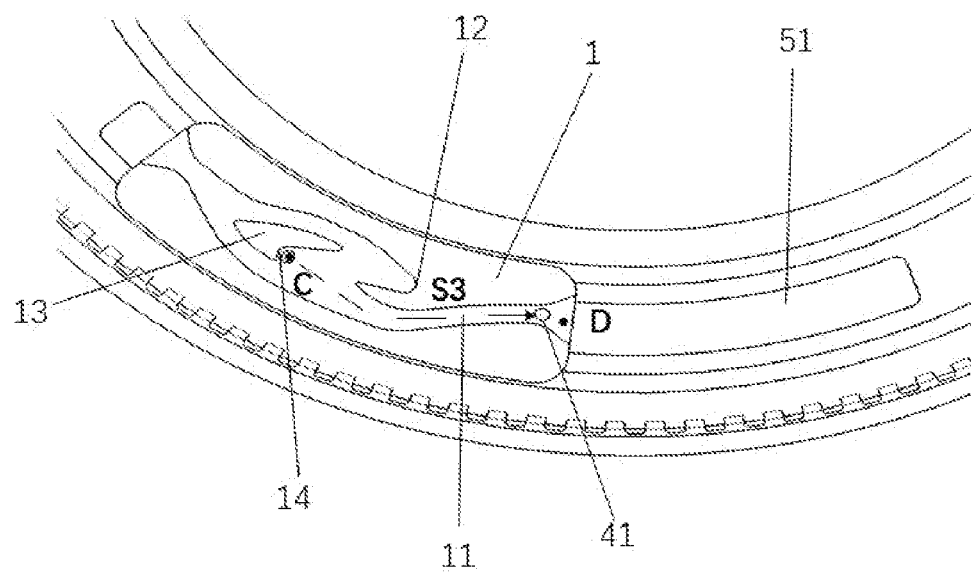
FIG. 4 is a detailed view of a first clutch in FIG. 1, where a deflector rod moves along a trajectory S3.

FIG. 4 shows a movement trajectory S3 of the deflector rod 41. In the figure, a point C is located at the first gap 14 of the first block 13, and a point D is located at an exit of the first slide rail 11. When the deflector rod 41 starts to move counterclockwise from the point C, the engagement with the first clutch is released again, the first slider 1 remains stationary relative to the first chute 51, and the deflector rod 41 slides counterclockwise along the trajectory S3 relative to the first slide rail 11 until the deflector rod slides out of the first chute 11 from the point D, thereby leaving the first clutch. The deflector rod continues to rotate counterclockwise to enter the second clutch.

Figure 5:
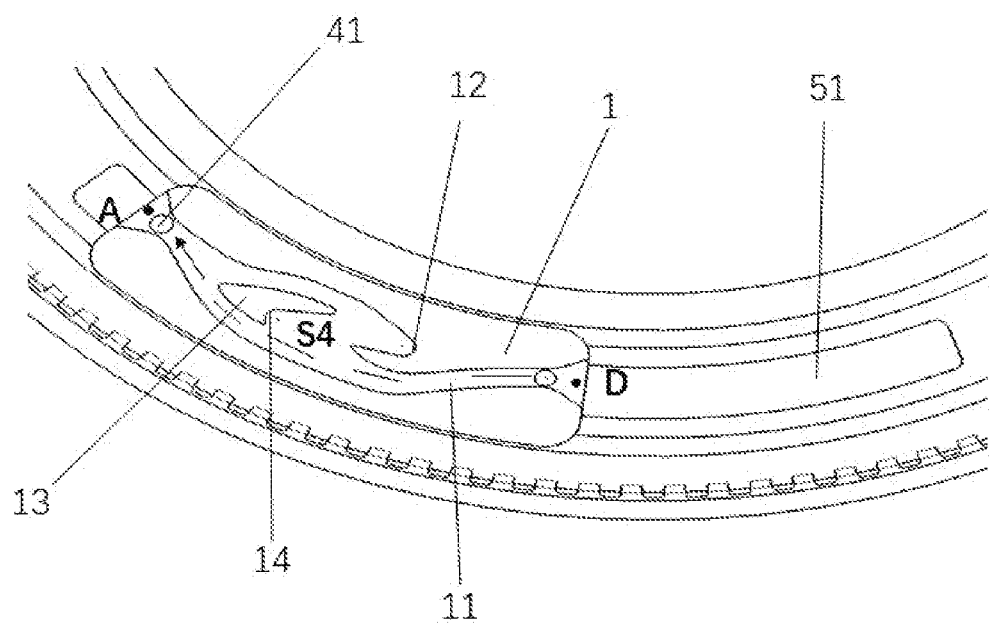
FIG. 5 is a detailed view of a first clutch in FIG. 1, where a deflector rod moves along a trajectory S4.

FIG. 5 shows a movement trajectory S4 of the deflector rod 41. In the figure, a point A is located at an entrance of the first slide rail 11, and a point D is located at an exit of the first chute 11. The deflector rod 41 rotates clockwise, enters the first chute 11 from the point D, and slides along the trajectory S4 until the deflector rod leaves the first chute 11 from the point A. In the sliding process shown in FIG. 5, the first slider 1 always remains stationary with the first chute 51, the deflector rod 41 slides clockwise relative to the first chute, and the deflector rod 41 is always disengaged from the first clutch, but directly passes through the first clutch from the second clutch to enter the third clutch.

Conversely, contrary to the trajectory S4 in FIG. 5, the deflector rod 41 can also enter the first chute 11 from the point A and slide directly counterclockwise to the point D, to directly pass through the first clutch from the third clutch to enter the second clutch.

Other embodiments of the present invention are not shown in the figures.

As a variant, shapes of the slide rail and the block are not limited to settings in the foregoing embodiment.

As a variant, the engaging element of the motor may also be in other forms, and is engaged with or disengaged from the clutch in other manners.

As a variant, the control system comprises two clutches:
a first clutch for controlling a horizontal vane of the air outlet of the air conditioner, and
a second clutch for controlling a longitudinal vane of the air outlet of the air conditioner.

The motor adjusts the horizontal vane when the engaging element of the motor is engaged with the first clutch.

The motor adjusts the longitudinal vane when the engaging element of the motor is engaged with the second clutch.

Each clutch has the same structure with the above mentioned clutch, which will not be detailed here.

As a variant, the control system comprises two clutches:
a first clutch for controlling a horizontal vane of the air outlet of the air conditioner, and
a second clutch for controlling an opening degree of a ventilation door of the air outlet of the air conditioner.

The motor adjusts the horizontal vane when the engaging element of the motor is engaged with the first clutch.

The motor adjusts the opening degree when the engaging element of the motor is engaged with the second clutch.

Each clutch has the same structure with the above mentioned clutch, which will not be detailed here.

As a variant, the control system comprises two clutches:
a first clutch for controlling a longitudinal vane of the air outlet of the air conditioner, and
a second clutch for controlling an opening degree of a ventilation door of the air outlet of the air conditioner.

The motor adjusts the longitudinal vane when the engaging element of the motor is engaged with the first clutch.

The motor adjusts the opening degree when the engaging element of the motor is engaged with the second clutch.

Each clutch has the same structure with the above mentioned clutch, which will not be detailed here.

Many embodiments and variants and improvements are known to a person skilled in the art. In particular, it should be noted that, unless explicitly mentioned, all the above features, optional solutions, and/or embodiments of the present invention can be combined with each other as long as they are not incompatible or mutually exclusive. All such other embodiments, changes, and modifications are within the scope of the appended claims. For example, the number of clutches can be four or five or more.

The above embodiments are used as examples and should not be construed as a limitation on the scope of the present invention. On this basis, a person skilled in the art can expect other embodiments with the same functions within the protection scope of the present application.

The invention claimed is:

1. A control system for an air outlet of an air conditioner in a vehicle, the control system comprising:
a motor;
a first clutch; and
a second clutch,
wherein:
the air outlet includes a horizontal vane, a longitudinal vane, and a ventilation door;
the first clutch controls a first element from a group including: the horizontal vane, the longitudinal vane, and an opening degree of the ventilation door;
the second clutch controls a different second element from said group;
the motor is adapted to engage respectively with each of the first and second clutches;
the motor adjusts the first element when the motor is engaged with the first clutch; and
the motor adjusts the second element when the motor is engaged with the second clutch.

2. The control system according to claim 1, further comprising a third clutch, wherein:
the first clutch is configured to control the horizontal vane;
the second clutch is configured to control the longitudinal vane;
the third clutch is configured to control the opening degree of the ventilation door,
the motor is adapted to engage respectively with the first clutch, the second clutch, and the third clutch,
the motor adjusts the horizontal vane when the motor is engaged with the first clutch;
the motor adjusts the longitudinal vane when the motor is engaged with the second clutch; and
the motor adjusts the opening degree of the ventilation door when the motor is engaged with the third clutch.

3. The control system according to claim 2, wherein the control system further comprises a disk having a first chute provided with a first slider for connecting with the horizontal vane, a second chute provided with a second slider for connecting with the longitudinal vane, and a third chute provided with a third slider for connecting with the ventilation door, the first chute and the first slider forming the first clutch, the second chute and the second slider forming the second clutch, and the third chute and the third slider forming the third clutch.

4. The control system according to claim 3, wherein the motor is adapted to engage respectively with the first, second, and third clutches via a deflector rod, one end of the deflector rod being connected to the motor, and another end of the deflector rod respectively deflecting the first slider to slide in the first chute, the second slider to slide in the second chute, and the third slider to slide in the third chute.

5. The control system according to claim 4, wherein the first slider is provided with a first slide rail, the second slider is provided with a second slide rail, and the third slider is provided with a third slide rail, the deflector rod sliding respectively in the first slide rail, the second slide rail, and the third slide rail.

6. The control system according to claim 5, wherein the first slide rail, the second slide rail, and the third slide rail are individually shaped slide rails.

7. The control system according to claim 5, wherein the first slide rail is provided with a first notch, the second slide rail is provided with a second notch, and the third slide rail is provided with a third notch.

8. The control system according to claim 5, wherein the first slide rail is provided with a first block, the second slide rail is provided with a second block, and the third slide rail is provided with a third block.

9. The control system according to claim 8, wherein the first block, the second block, and the third block are individually shaped.

10. The control system according to claim 8, wherein the first block is provided with a first gap, the second block is provided with a second gap, and the third block is provided with a third gap.

11. An air conditioner in a vehicle comprising an air outlet, the air outlet comprising a longitudinal vane, a horizontal vane, a ventilation door, and the control system according to claim 1.

12. An air conditioner in a vehicle comprising an air outlet, the air outlet comprising a longitudinal vane, a horizontal vane, a ventilation door, and the control system for according to any one of claims 2 to 10.

\* \* \* \* \*